No. 803,510. PATENTED OCT. 31, 1905.
W. A. SANKEY.
PNEUMATIC TIRE.
APPLICATION FILED JAN. 24, 1905.
2 SHEETS—SHEET 1.
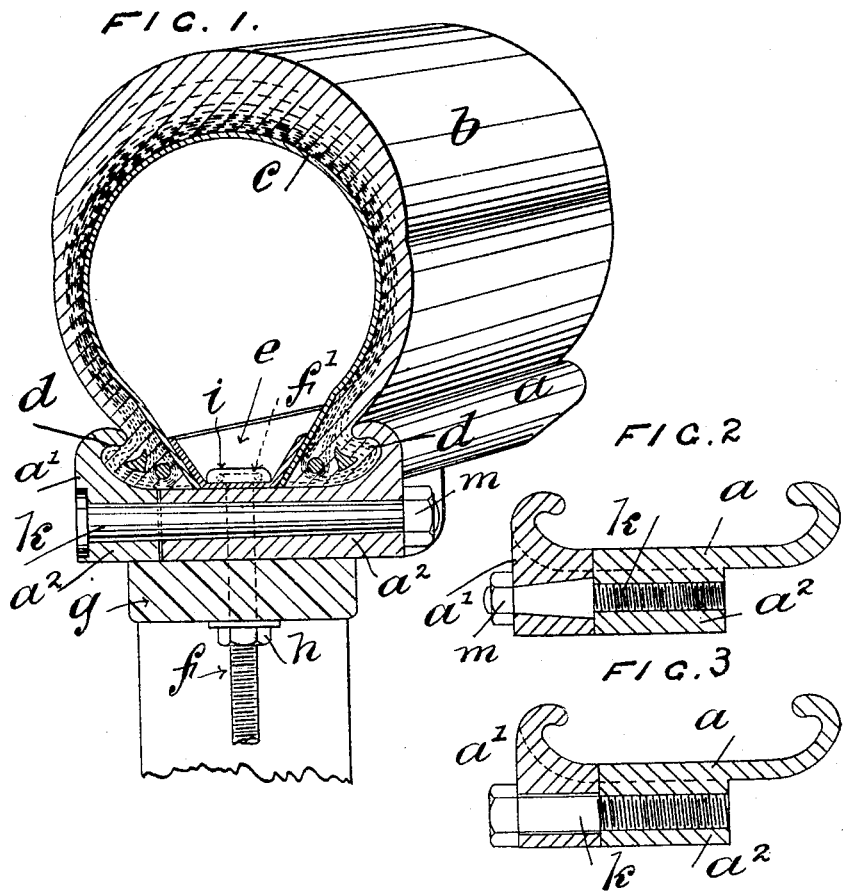
WITNESSES.
H. M. Kuehne
John A. Percival
INVENTOR.
William Alfred Sankey.
By his Attorneys Richardson

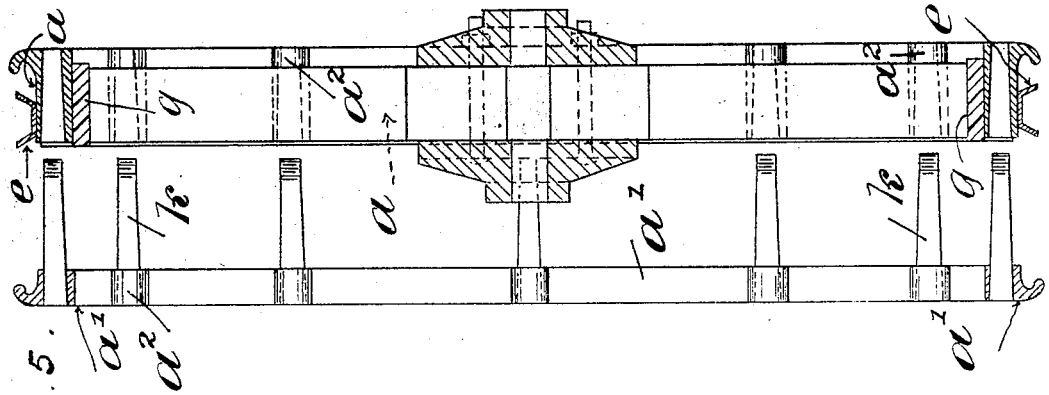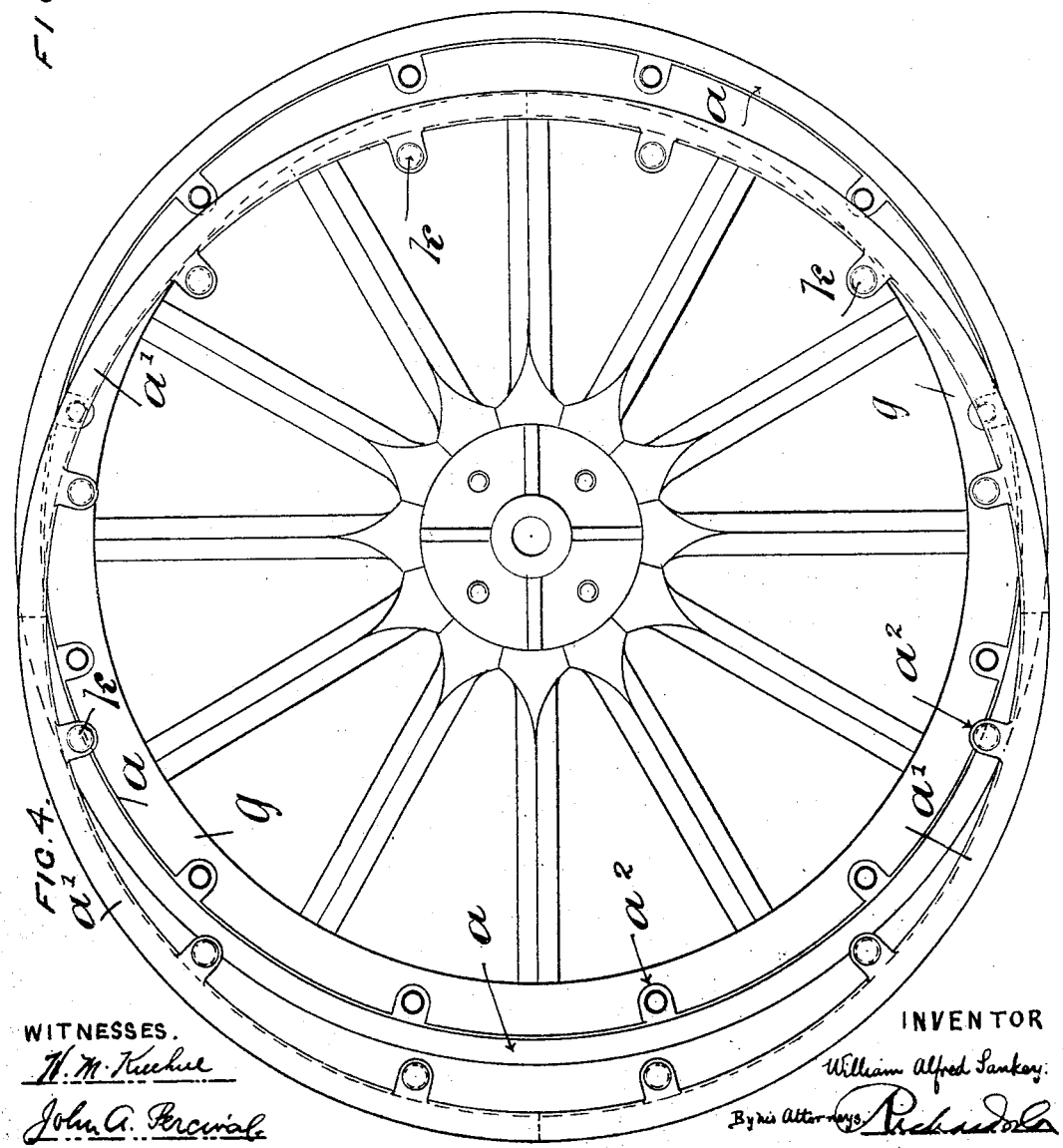

UNITED STATES PATENT OFFICE.

WILLIAM ALFRED SANKEY, OF SUTTON, ENGLAND, ASSIGNOR TO FRANK REDDAWAY, OF PENDLETON, MANCHESTER, ENGLAND.

PNEUMATIC TIRE.

No. 803,510. Specification of Letters Patent. Patented Oct. 31, 1905.

Application filed January 24, 1905. Serial No. 242,545.

*To all whom it may concern:*

Be it known that I, WILLIAM ALFRED SANKEY, manager of Pneumatic Tyre Works, a subject of the King of Great Britain, residing at Cumnor Road, Sutton, in the county of Surrey, England, have invented new and useful Improvements in or Connected with Pneumatic Tires for Vehicle-Wheels, of which the following is a specification.

My invention has reference to pneumatic tires for vehicle-wheels chiefly adapted for motor-cars and heavy vehicles generally.

My object is to provide an endless separate and detachable ring of metal or other suitable material of trough or other convenient shape to wedge or jam between the inside edges of the tire-cover to effectually secure the edges of the tire-cover to the wheel-rim throughout the entire circumference, thus insuring against the slightest possibility of injurious creeping with its consequent friction and mutilation in any portion or portions of the tire-cover; secondly, to effectually secure the tire-cover to the wheel-rim by the same means and so prevent the tire from being wrenched or blown off in any portion or portions of its circumference; thirdly, when using a ring of this description and in manner described hereinafter in conjunction with a suitable cover to obtain a tubeless tire—that is, a tire in which the inner air-tube is dispensed with—which shall be easy to attach and detach, rendering great facility in repairing same in case of puncture. In combination with such an endless wedging ring and to facilitate the attaching and detaching of the tire to or from the rim I use a wheel-rim of which one upturned or curved edge can be entirely removed, such edge being formed separate from the rim and secured thereto by means of suitable bolts and nuts, and in order that my invention may be completely understood I have attached hereto two sheets of drawings, to which I shall refer during the course of the following description.

Figure 1 of the drawings shows in cross-section my invention adapted as a tubeless tire. Figs. 2 and 3 show modified means for bolting the rim together. Fig. 4 is a front elevation of rim used under my invention, the removable edge being shown detached and the rim shown upon a suitable type of motor-car wheel. Fig. 5 is an edge view of same with the rim and removable edge in section.

In carrying my invention into effect I provide a rim $a$, formed with a flat or practically flat bed, and a tire-cover $b$, having an inner lining $c$, of rubber or other resilient material. The cover $b$ is provided with beaded or thickened edges $d$, the upturned or curved sides of the rim being suitably shaped to accommodate such edges, as will be understood. In place of or in addition to the thickened edge an endless wire may be used.

In the drawings I show a tire-cover having a beaded edge and endless wire, such as forms the subject-matter of an application for United States patent made by me on even date herewith. To secure the tire-cover $b$ firmly to the rim and to obtain the necessary air-tight joint, I employ the endless ring $e$, already referred to, and which is the essence of this invention, which closely encircles the flat base of the rim and is jammed between the inner edges $d$ of the cover $b$. To effect this, when assembling the parts the removable edge $a'$ of the rim $a$ is taken away, as shown in Fig. 4, when one edge $d$ of the cover $b$ can be easily slipped laterally upon the flat bed of the rim. The endless trough or suitable wedge-shaped ring $e$ is then placed on the rim by a similar lateral movement until one of its upturned edges bears against the inner edge of the cover. A valve $f$ for inflating purposes is arranged fluid-tight through holes in the trough-shaped ring $e$, the rim $a$, and the felly $g$, upon which the rim is secured, a locknut $h$, bearing upon the felly, being tightened up to bring the valve-seat down onto the endless ring. Such a valve-seat for the valve could be provided for by a ring or washer $i$, of rubber or other resilient material, inserted between the head $f'$ of the valve and the ring $e$, as shown in Fig. 1. The other edge of the cover is then placed upon the rim, and the loose edge $a'$ of the rim $a$, providing a recess for the beaded edge of the cover, is placed in position and secured by means of the taper bolts $k$, attached to the snugs $a^2$, formed on the under side of the removable edge $a'$, which pass through taper holes bored in the snugs $a^2$ on the under side of the rim $a$, nuts $m$ securing the whole together. The taper bolts $k$ may be secured to the snugs of the rim $a$, as shown in Fig. 2, and pass through holes formed in the snugs carried by the ring $a'$, or bolts $k$, passing loosely through the snugs of the removable edge $a'$ and screwing into the snugs of the rim $a$, may be used, if desired.

(See Fig. 3.) The removable edge $a'$ of the rim $a$ may be continuous or in segments, as shown in dotted lines in Fig. 4. The inner clamping-ring $e$ is made of width sufficient to obtain a powerful pressure of its edges against the inner edges $d$ of the cover $b$ when the securing-nuts $m$ are screwed home upon the bolts $k$. Thus the edges of the cover are tightly wedged up throughout their entire circumference into the recesses of the sides of the rim. This not only will secure an airtight joint obviating any necessity for an inner tube, but the cover cannot creep nor be wrenched out of the rim. The metal trough-shaped ring $e$ may be covered with resilient material—such as leather or rubber, if desired. It is obvious that so long as the sides of the ring $e$ are capable of exerting a wedging action upon the edges of the tire-cover against the edges of the rim it need not be hollow or trough-shaped, as shown. I may make it solid from aluminium or other suitable metal or alloy. An inner tube may be used, if desired. For instance, to obviate the necessity for immediately repairing a puncture of the tubeless tire a spare tube may be carried, which could easily be placed in position with its valve occupying the same aperture made in the felly, rim, and ring for the valve used for inflating the tubeless tire, which latter valve could be removed for the purpose.

I declare that what I claim is—

In combination a vehicle-wheel having its felly provided with lateral recesses, a channeled rim fitting on said felly and having lugs engaging in said recesses, said channeled rim being formed of a stationary part, and a removable part, bolts passing through the lugs of the removable and stationary parts to hold said parts together, a cover having a lining rendered impervious to air under pressure having beaded edges and a wire embedded in each of said edges, an endless separate ring to encircle the bed of the rim and wedge the edges of the cover against the sides or edges of the rim, a valve for inflating the cover with means for mounting the valve fluid-tight to prevent the escape of air, substantially as described.

In testimony whereof I have signed my name to this specification in the presence of two subscribing witnesses.

WILLIAM ALFRED SANKEY.

Witnesses:
ALFRED NUTTING,
R. F. WILLIAMS.